United States Patent
Kumar et al.

(10) Patent No.: US 7,020,351 B1
(45) Date of Patent: Mar. 28, 2006

(54) METHOD AND APPARATUS FOR ENHANCING AND INDEXING VIDEO AND AUDIO SIGNALS

(75) Inventors: Rakesh Kumar, Monmouth Junction, NJ (US); Harpreet S. Sawhney, West Windsor, NJ (US); Keith Hanna, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 550 days.

(21) Appl. No.: 09/680,669

(22) Filed: Oct. 6, 2000

Related U.S. Application Data (60) Provisional application No. 60/158,469, filed on Oct. 8, 1999.

(51) Int. Cl.
  *G06K 9/54* (2006.01)
(52) U.S. Cl. ............... 382/305; 382/306; 345/968; 379/93.25; 707/6; 707/102
(58) Field of Classification Search ............... 382/305, 382/306; 345/968; 379/93.25; 707/6, 102
See application file for complete search history.

(56) References Cited

U.S. PATENT DOCUMENTS

| | | | | |
|---|---|---|---|---|
| 5,063,603 A | | 11/1991 | Burt | 382/115 |
| 5,559,949 A | * | 9/1996 | Reimer et al. | 345/720 |
| 5,572,596 A | | 11/1996 | Wildes et al. | 382/117 |
| 5,590,262 A | * | 12/1996 | Isadore-Barreca | 715/500.1 |
| 5,635,982 A | | 6/1997 | Zhang et al. | 348/231.99 |
| 5,724,100 A | | 3/1998 | Kuchibhotla | 375/240.24 |
| 5,751,286 A | | 5/1998 | Barber et al. | 345/835 |
| 5,768,447 A | * | 6/1998 | Irani et al. | 382/305 |
| 5,805,733 A | * | 9/1998 | Wang et al. | 382/232 |
| 5,821,945 A | | 10/1998 | Yeo et al. | 345/440 |
| 5,956,716 A | * | 9/1999 | Kenner et al. | 707/10 |
| 5,963,203 A | | 10/1999 | Goldberg et al. | 345/723 |
| 5,969,755 A | * | 10/1999 | Courtney | 348/143 |
| 6,034,733 A | * | 3/2000 | Balram et al. | 348/448 |
| 6,157,929 A | * | 12/2000 | Zamiska et al. | 707/200 |
| 6,195,458 B1 | * | 2/2001 | Warnick et al. | 382/173 |
| 6,219,462 B1 | | 4/2001 | Anandan et al. | 382/294 |
| 6,268,864 B1 | * | 7/2001 | Chen et al. | 345/428 |

(Continued)

FOREIGN PATENT DOCUMENTS

WO 98/21688 5/1998

(Continued)

OTHER PUBLICATIONS

M. Shibata, Y-B Kim, "Content-Based Structuring of Video Information", 1996 IEEE Proceedings of MULTIMEDIA'96, pp. 330-333.

(Continued)

*Primary Examiner*—Andrew W. Johns
*Assistant Examiner*—Patrick L. Edwards
(74) *Attorney, Agent, or Firm*—Lowenstein Sandler (57) ABSTRACT

A method and apparatus for indexing digital video and audio signals using a digital database. A user may index the digital images by content within the images, through annotation, and the like. The database can contain high resolution and low resolution versions of the audio-video content. The indexed video can be used to create web pages that enable a viewer to access the video clips. The indexed video may also be used to author digital video disks (DVDs). The video may be enhanced to achieve DVD quality or be accessed to enhancing the digital signals and indexing the digital signals. The user may choose to enhance the digital signals by combining frames into a panorama, enhancing the resolution of the frames, filtering the images, and the like.

16 Claims, 3 Drawing Sheets

U.S. PATENT DOCUMENTS

| | | | |
|---|---|---|---|
| 6,278,446 B1 * | 8/2001 | Liou et al. | 345/700 |
| 6,310,625 B1 * | 10/2001 | Yoshio et al. | 345/473 |
| 6,343,298 B1 * | 1/2002 | Savchenko et al. | 707/104.1 |
| 6,453,459 B1 * | 9/2002 | Brodersen et al. | 717/100 |
| 6,462,754 B1 * | 10/2002 | Chakraborty et al. | 345/723 |
| 6,496,981 B1 * | 12/2002 | Wistendahl et al. | 725/112 |
| 6,535,639 B1 * | 3/2003 | Uchihachi et al. | 382/225 |
| 6,546,185 B1 * | 4/2003 | Kim et al. | 386/46 |

FOREIGN PATENT DOCUMENTS

| | | |
|---|---|---|
| WO | 98/50885 | 11/1998 |

OTHER PUBLICATIONS

S. Smollar, H. Zhang, "Content'Based Video Indexing and Retrieval", 1994 IEEE Multimedia, pp. 62-72.

M. Irani, S. Peleg, "Improving Resolution by Image Registration", Graphical Models and Image Processing, vol. 53, No. 3, May, pp 231-239, 1991.

P.H.S. Torr, Dept. of Engineering Science, Oxford University, "Geometric Motion Segmentation and Model Selection", Phil. Trans. R. Soc. Lond. A (1996) (submitted) pp 1-17.

Dickson, et al., "The Gemini Process: A Theatrical-Quality Video-to-Film Transfer Process," Better Video Images, Incl. 23rd Annual SMPTE Television Conf. San Francisco, CA Feb. 3-4, 1989, 30-35.

Sakauchi, et al., "Multimedia Database Systems for the Contents Mediator," IEICE Transactions on Information and Systems, Inst. Elec. Info and Comm. Eng, Tokyo, JP, vol. E79-D, No. 6, Jun. 1, 1996, 641-646.

Ueda, et al., "Automatic Structure Visualization for Video Editing," Proceedings of the Conf. On Human Factors in Computing System, (INTERCHI), Reading, Addison Wesley, Apr. 24, 1993, 137-141.

Zhang, et al., "Structured and Content-based Video Browsing," IEEE, vol. 1, 1998, 910-914.

International Search Report dated Sep. 25, 2003 for corresponding PCT application, PCT/US00/27924.

* cited by examiner

METHOD AND APPARATUS FOR ENHANCING AND INDEXING VIDEO AND AUDIO SIGNALS

This application claims the benefit of U.S. Provisional Application No. 60/158,469, filed on Oct. 8, 1999, which is herein incorporated by reference.

The invention relates to audio-video signal processing and, more particularly, the invention relates to a method and apparatus for enhancing and indexing video and audio signals.

BACKGROUND OF THE DISCLOSURE

Over the years, video camera (camcorder) users create a large library of video tapes. Each tape may contain a large number of events, e.g., birthdays, holidays, weddings, and the like, that have occurred over a long period of time. To digitally store the tapes, a user must digitize the analog signals and store the digital signals on a disk, DVD, or hard drive. Presently there is no easy way to organize the digital recordings or to store such recordings in an indexed database where the index is based upon the content of the audio or video within a clip. As such, the digital recording is generally stored as a single large file that contains the many events that were recorded on the original tape. As such, the digitized video is not very useful.

Additionally, although consumer electronics equipment is available for processing digital video, the quality of the video is not very good, i.e., this video does not have a quality that approaches DVD quality. The digital video has the quality of analog video (e.g., VHS video). As such, there is a need for consumers to enhance digital video and create their own indexable DVDs having DVD quality video and audio. However, presently there is not a cost effective, consumer electronics product available that would enable the home user to organize, index and enhance the digital video images for storage on a DVD.

Therefore, a need exists in the art for techniques that could be used in a product that enables a consumer to enhance and index the digital signals.

SUMMARY OF THE INVENTION

The invention provides a method, article of manufacture, and apparatus for indexing digital video and audio signals using a digital database. A user may index the digital images by content within the images, through annotation, and the like. The database may contain high resolution and low resolution versions of the audio-video content. The indexed video can be used to create web pages that enable a viewer to access the video clips. The indexed video may also be used to author digital video disks (DVDs). The video may be enhanced to achieve DVD quality. The user may also choose to enhance the digital signals by combining frames into a panorama, enhancing the resolution of the frames, filtering the images, and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
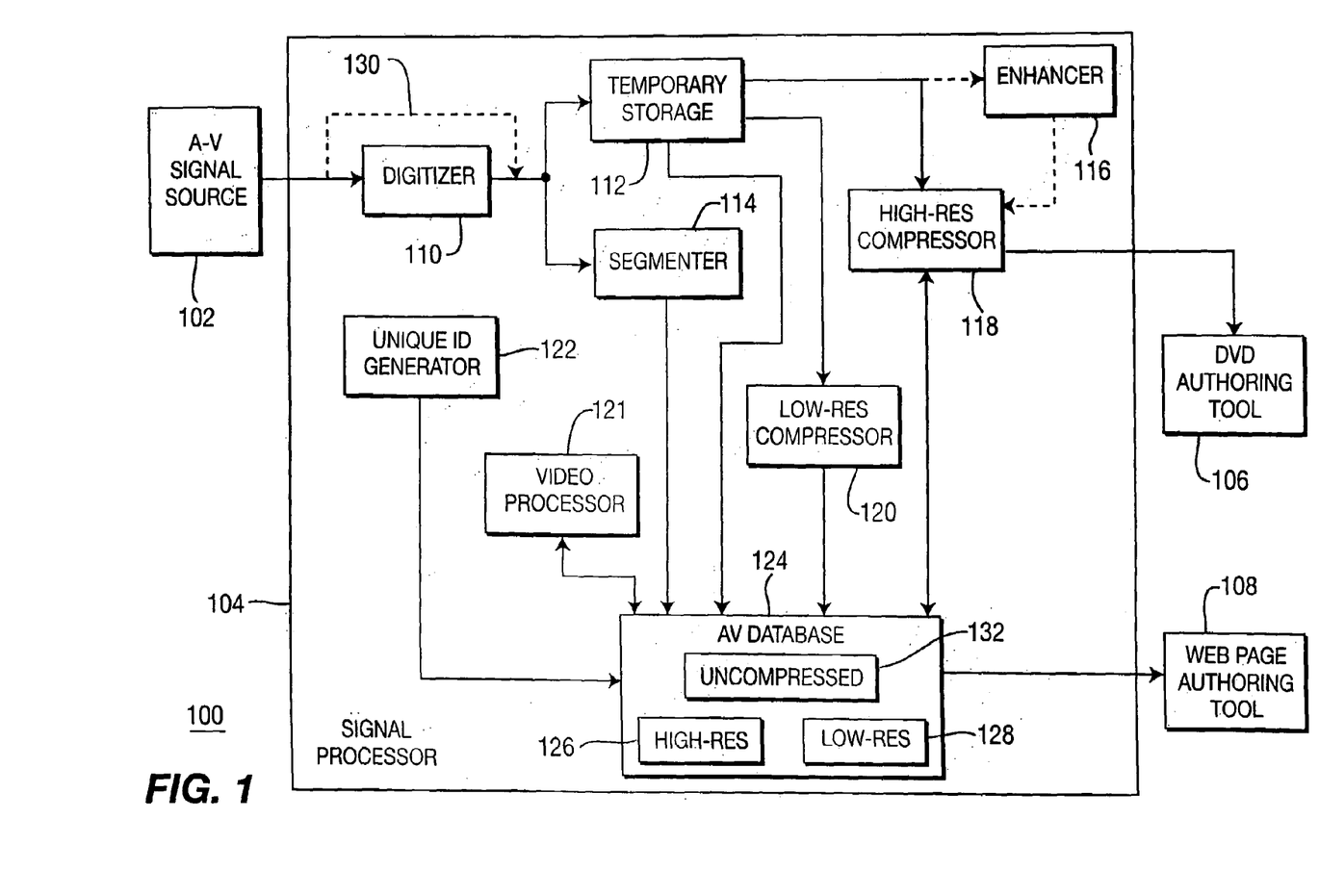
FIG. 1 depicts functional block diagram of a audio-video signal indexing system.

FIG. 1 depicts a functional block diagram of a system 100 for organizing and indexing audio-visual (AV) signals. The system 100 comprises a source 102 of AV signals, a signal processor 104, a DVD authoring tool 106, and a web page authoring tool 108. The invention lies in the signal processor 104. The AV source 102 may be any source of audio and video signals including, but not limited to, an analog or digital video tape player, an analog or digital camcorder, a DVD player, and the like. The DVD authoring tool and the web page authoring tool represent two applications of the AV signals that are processed by the signal processor 104 of the present invention.

The signal processor 104 comprises a digitizer 110, a unique ID generator 122, an AV database 124, a temporary storage 112, a segmenter 114, a video processor 121, a low resolution compressor 120, and a high resolution compressor 118. A signal enhancer 116 is optionally provided. Additionally, if the source signal is a digital signal, the digitizer is bypassed as represented by dashed line 130.

The digitizer 110 digitizes the analog AV signal in a manner that is well-known in the art. The digitized signal is coupled in an uncompressed form to the temporary storage 112. Alternatively, the AV signal can be lightly compressed before storing the AV signal in the temporary storage 112. The temporary storage 112 is generally a solid-state random access memory device. The uncompressed digitized AV signal is also coupled to a segmenter 114. The segmenter 114 divides the video sequence into clips based upon a user defined criteria. One such criteria is a scene cut that is detected through object motion analysis, pattern analysis and the like. As shall be discussed below, many of segmentation criteria may be used. Each segment is coupled to the database 124 (a memory) and stored as a computer file of uncompressed digital video 132. The unique ID generator 122 produces a unique identification code or file name for each file to facilitate recovery from the database. In addition to the file of AV information, a file containing ancillary data associated with a particular clip is also formed. The ancillary data may include flow-fields, locations of objects in the video, or different indexes that sort the video in different ways. For example, one index may indicate all those segments that contain the same person.

These files and their unique IDs form the basis for indexing the information within the AV source material. Processing of the criteria used to index the video segments is performed by video processor 121. Indexing organizes the video efficiently both for the user and for the processing units of applications that may use the information stored in the database (e.g., video processor 121 or an external processing unit). The simplest method of organizing the video for the processing units is to segment the video into temporal segments, regardless of the video content. Each processor then processes each segment, and a final processor reassembles the segments.

A second method for indexing the video for efficient processing is to perform sequence segmentation using scene cut detection to form video clips containing discrete scenes. Methods exist for performing scene cut detection including analysis of the change of histograms over time, and the analysis of the error in alignment after consecutive frames have been aligned. U.S. Pat. No. 5,724,100, issued Mar. 3, 1998, discloses a scene cut detection process. Additionally, methods for performing alignment and computing error in alignment are disclosed in U.S. patent application Ser. No. 09/384,118, filed Aug. 27, 1999, which is incorporated herein by reference. If the alignment error is significant, then a scene cut has likely occurred. Another approach to video sequence segmentation is to combine a time-based method and a motion-based method of segmenting the video where video is first segmented using time, and individual processors within segmenter 114 then process the individual video segments using scene cut detection. Part of this processing is typically motion analysis, and the results of this analysis can be used to detect scene cuts reliably with minimal additional processing.

Figure 2:
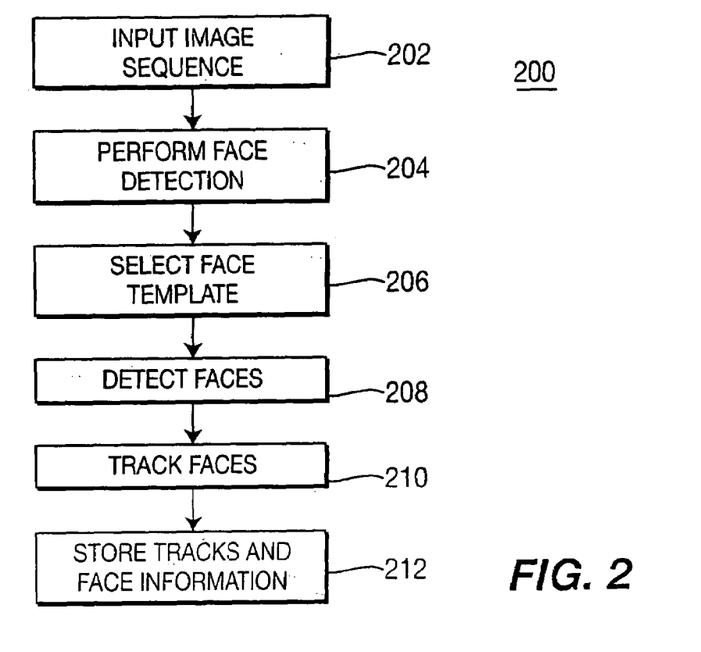
FIG. 2 depicts a flow diagram of a method for indexing video clips based upon face tracking.

It may be useful for objects (or other attributes) within the video sequence to be detected and tracked. A user can then "click on" a portion of the scene and the system would associate that portion of the scene with an object. For example, the user may "click on" a person's face, and the authoring tool could then retrieve all video segments containing a similar face in the video. It is typically difficult to match a face when the face is viewed from two different viewpoints. However it is much simpler to track a face as it changes viewpoints. Thus, the invention tracks selected faces through one or more scenes using the video processor 121. FIG. 2 depicts a flow diagram of an approach 200 to face detection and tracking.

Step 202—Input Image Sequence.

Step 204—Perform face detection. This can be done either by a user "clicking on" the video, or by performing a method that detects faces. An example of such a method is described in U.S. Pat. No. 5,572,596, issued Nov. 5, 1996 and incorporated herein by reference. Typically automatic face detectors will locate frontal views of candidate faces.

Step 206—Select Face Template. The location of the face is used to select a face template, or set of face features that are used to represent the face. An example is to represent the face as a set of templates at different resolutions. This process is described in detail in U.S. Pat. No. 5,063,603 issued Nov. 5, 1991 and U.S. Pat. No. 5,572,596, issued Nov. 5, 1996 herein incorporated by reference.

Step 208—Detect faces. The video is then processed to locate similar faces in the video. Candidate matches are located first at coarse resolutions, and then subsequently verified or rejected at finer resolutions. Methods for performing this form of search are described in detail in U.S. Pat. Nos. 5,063,603 and 5,572,596. The clip identification, the face identification and the location coordinates of the face are stored in memory. The face identification is given a unique default name that can be personalized by the user. The default name, once personalized, would be updated throughout the database.

Step 210—Track faces. The locations where similar faces in the video have been detected are then tracked using a tracker that is not necessarily specific to tracking faces. This means that the tracker will function if the person in the scene turns away or changes orientation. Example of such a tracker include a frame-to-frame correlator, whereby a new template for correlation is selected at each frame in the video and tracked into the next frame of the video. The new location of the feature is detected by correlation, and a new template is then selected at that image location. The tracking feature is also used across clips such that, once a person is identified in one clip, a match in another clip will automatically identify that person.

Step 212—Store Tracks and Face Information. An image of the face region detected by the initial face finder can be stored, as well as the tracks of the person's face throughout the video. The presence of a track of a person in a scene can be used for indexing. For example, a user can click on a person in a scene even when they are turned away from the camera, and the system will be able to locate all scenes that contain that person by accessing the database of faces and locations.

Returning to FIG. 1, the temporary storage 112 is coupled to the high resolution compressor 118, the low resolution compressor 120, and the A/V database 124. The digital AV signals are recalled from storage 112 and compressed by each compressor 118 and 120. For example, the low resolution compressor 120 may process the uncompressed video into a standard compression format such as the MPEG (Moving Pictures Experts Group) standard. The low resolution compressed image sequence is stored in the database as LOW RES 128. The high resolution compressor 118 may, for example, compress the AV signal into a format that is DVD compatible. The high resolution compressed images may be stored in the database as HIGH RES 126 or maybe coupled directly to the DVD authoring tool for storage on a DVD without storing the high resolution video in the database 124. The invention may also retrieve the digital video signals from storage 112 and couple those signals, without compression, to the AV database 124 for storage as uncompressed video 132. As such, the database 124 can be accessed to recall high resolution compressed digital video signals, low resolution compressed digital video signals, and uncompressed digital video signals.

The web page authoring tool can be used to create web pages that facilitate access to the low resolution files 128 and the uncompressed video clips. In this manner, a consumer may create a web page that organizes their video tape library and allows others to access the library through links to the database. The indexing of the clips would allow users to access imagery that has, for example, a common person (face tracking) or view the entire video program (the entire tape) as streamed from the low resolution file 128.

The DVD authoring tool 106 stores the high resolution compressed AV material and also stores a high resolution compressed version of the clips from the database. As such, the database contents can be compressed and stored on the DVD such that the indexing feature is available to the viewer of the DVD. Additionally, the DVD authoring tool enables a user to insert annotations to the video clips such that people or objects in the video can be identified for future reference.

The audio signals may also be indexed such that the voice of particular people could be tracked as the faces are tracked and the clips containing those voices can be indexed for easy retrieval. Keywords useage can also be indexed such that clips wherein certain words are uttered can be identified.

The video and audio signals can be enhanced before high resolution compression is applied to the signals. The enhancer 116 provides a variety of video and audio enhancement techniques that are discussed below.

Applications: Web & DVD Usage

The enhanced and indexed video is presented to a user on a variety of different media, for instance the Web and DVDs. The presentation serves two purposes. The first one is for high quality viewing but without the limitation of a linear media like video tapes. The viewing may be arranged by the viewer to be simply linear like the one for a video tape, or the viewing may be random access where the user chooses an arbitrary order and collection of clips based on the indexing information presented to her. The second purpose served by the Web and DVD media is for the user to be able to create edit lists, order forms, and her preferred video organization. Such a user oriented organization can be further used by the system to create new video organizations on the Web and DVDs. In short, the Web and DVD media are used both as an interaction media with the user for the user's feedback and preferences, as well as for the ultimate viewing of the enhanced and indexed material.

Authoring Tool Interaction Mode

The interaction mode works in conjunction with the Web Video Database server to provide views of the user's data to the user and to create new edit lists at the server under user control. Alternatively, the interaction mode may be a standalone application that the user runs on a computing medium in conjunction with the user's organized videos on an accompanying DVD/CD-ROM or other media. In either case, the interaction leads to a new edit list provided to the server for production and organization of new content. For instance, one such interaction may lead to the user selecting all the video clips of her son from ages 0 to 15 to be shown at an upcoming high-school graduation party.

The interaction mode is designed to present to the user summarized views of her video collection as storyboards consisting of:

Time-ordered key frames as thumbnail summaries
  Each clip delineated using various forms of scene cuts is summarized into a single or a set of key frames
Thumbnails of synopsis mosaics as summaries of clips
Iconized or low-resolution index cards like displays of summaries of significant objects and backgrounds within a clip
Clips organized by presence of a particular or some objects (may be user-defined)
Clips depicting similar scenes, for example a soccer field
Clips depicting similar events, for example a dance A comprehensive organization of videos into browsable storyboards has been described in U.S. patent application Ser. No. 08/970,889, filed Nov. 14, 1997, which is incorporated herein by reference. These processes can be incorporated into a web page authoring tool.

At any time during the browsing of the storyboards, the user can initiate any of a number of actions:

View any video clip. The video clip may be available either as a low-resolution small size clip or a high quality enhanced clip depending on the quality of service subscribed to by the viewer.
Create folders corresponding to different themes, for example, a folder that will contain all the video clips of a given person. Another folder that will contain all the clips of a church wedding ceremony, etc.
Associate specific clips with the folders using drag-and-drop, point-and-click, textual descriptors and/or audio descriptors.
Create timelines of ordered clips within each folder.

The arrangement of clips and folders created by the user is finally submitted to a server either through the Web, email, voice or print media.

The server then creates appropriate final forms of the users' ordered servings.

Viewing Mode

The viewing mode allows a user to view the enhanced and indexed videos in a linear or content-oriented access form. Essentially all the storyboard summary representations used in the interactive modes are available to the user. For DVD usage the viewing will typically be on a TV. Therefore, the interaction in this mode will be through a remote control rather than the conventional PC oriented interaction. In any case, the user can access the video information with the clip being the atomic entity. That is, any combination of clips from folders may be played in any order through point and click, simple keying in and/or voice interaction.

Hot links in the video stream are recognized with inputs from the user to enable the user to visually skip from clip-to-clip. For example, the user may skip from the clip of a person to another clip of the same person by clicking in a region of the video that may be pre-defined or where that person is present. The indexing information stored along with the video data provides the viewer with this capability. To facilitate such indexing, specific objects and people in each clip are identified by a name and an x-y coordinate set such that similar objects and people can be easily identified in other video clips. This index information can be presorted to group clips having similar information such that searching and access speed are enhanced.

Similarly, user-ordered annotations may be added to the index of the video stream or in the video stream such that the annotations appear at the time of viewing under user control. For instance identity of persons, graphics attached to persons, and the like appear on the video under user control.

Signal Enhancer 116

Figure 3:
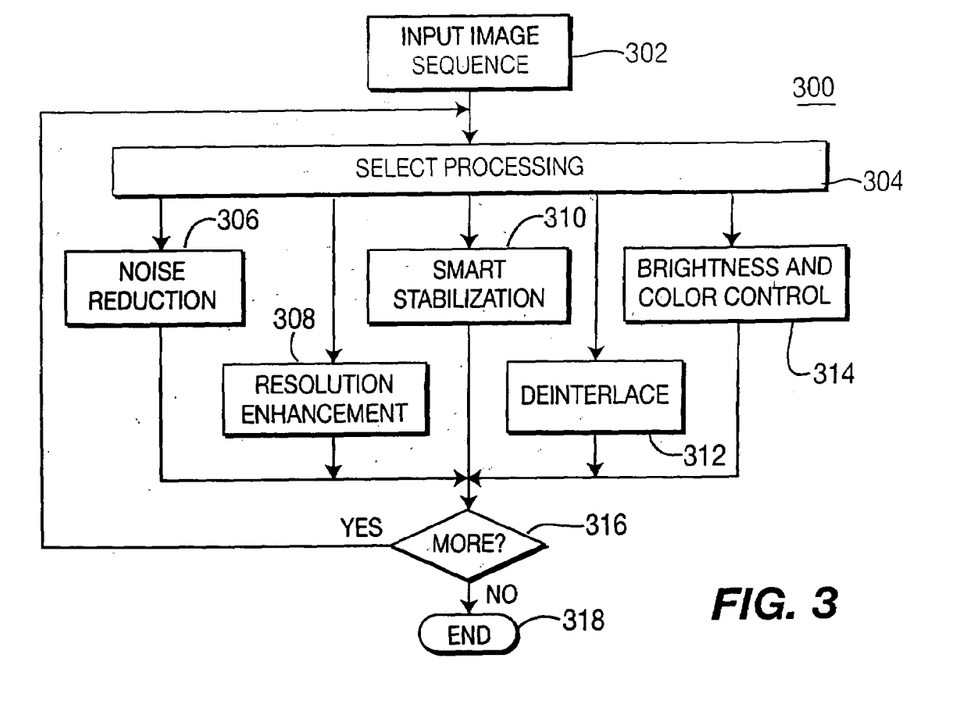
FIG. 3 depicts a functional block diagram of the video enhancement processor of FIG. 1.

It is often desirable to improve the perceived quality of imagery that is presented to a viewer. FIG. 3 depicts a flow diagram of the method 300 of operation of the enhancer 116. The method 300 starts by inputting an image sequence at step 302. At step 304, a user selects the processing to be performed to enhance the image sequence. These processes include: noise reduction 306, resolution enhancement 308, smart stabilization 310, deinterlace 312, and brightness and color control 314. Once a process has been completed, the method 300 proceeds to step 316. At step 316, the method queries whether any further processing of the sequence is to be performed. If the query is affirmatively answered, the routine proceeds to step 304; otherwise, the method proceeds to step 318 and ends.

More specifically, examples of improvement include noise reduction and resolution enhancement. Image quality may be poor for several reasons. For example, noise may be introduced in several places in the video path: in the sensor (camera), in circuitry after the sensor, on the storage medium (such as video tape), in the playback device (such as a VCR), and in the display circuitry. Image resolution may be low due to, for example, the use of a low-resolution sensor, or due to poor camera focus control during image acquisition. For example, VHS video tape images have approximately one-half of the resolution of DVD images. As such, it is highly desirable to improve a VHS-type image to achieve DVD resolution.

Noise Reduction 306

Noise in imagery is one of the most significant reasons for poor image quality. Noise can be characterized in several ways. Examples include intensity-based noise, and spatial noise. When intensity-based noise occurs, the observed image can be modeled as a pristine image whose intensities are corrupted by an additive and/or multiplicative distribution noise signal. In some cases this noise is fairly uniformly distributed over the image, and in other cases the noise occurs in isolated places in the image. When spatial noise occurs, then portions of features in the image are actually shifted or distorted. An example of this second type of noise is line-tearing, where the vertical component of lines in the image are mislocated horizontally, causing the line to jitter over time.

Methods to remove this and other types of noise, include but are not limited to:
1) Aligning video frames using methods disclosed in U.S. patent application Ser. No. 09/384,118, filed Aug. 27, 1999, and using knowledge of the temporal characteristics of the noise to reduce the magnitude of the noise or by combining or selecting local information from each frame to produce an enhanced frame.
2) Modification of the processing that is performed in a local region depending on a local quality of alignment metric, such as that disclosed in U.S. patent application U.S. patent application Ser. No. 09/384,118, filed Aug. 27, 1999.
3) Modification of the processing that is performed in a local region, depending on the spatial, or temporal, or spatial/temporal structure of the image.

The following are examples of image alignment-based noise reduction techniques.

Figure 4:
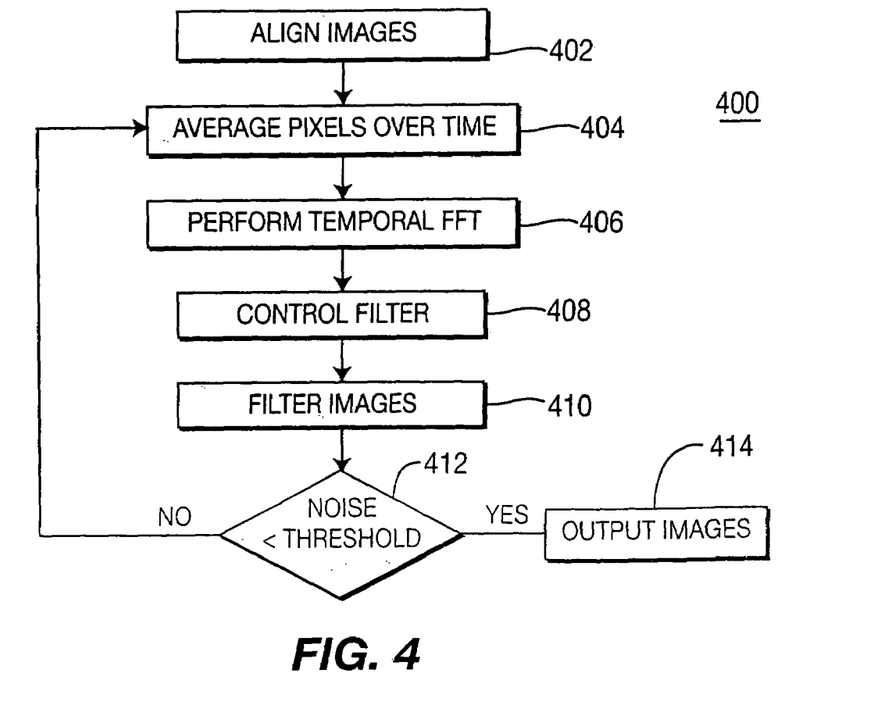
FIG. 4 depicts a flow diagram of a method for reducing image noise.

A first example of method 1) includes processing to remove zero-mean intensity-based noise. After the imagery is aligned, the image intensities are averaged to remove the noise. FIG. 4 depicts a method 400 for reducing noise in accordance with the invention. At step 402, the images of a video clip or portion of a video clip (e.g., 9 frames) are aligned with one another. At step 404, pixels in the aligned images are averaged over time. Then, at step 406, a temporal Fast Fourier Transform (FFT) is performed over multiple aligned images. The output of the FFT is used, at step 408, to control a temporal filter. The filter is optimized by the FFT output to reduce noise in the video clip. At step 410, the filter is applied to the images of the video clip. At step 412, the method 400 queries whether the noise in the images is reduced below a threshold level, this determination is typically performed by monitoring the output of the FFT. If the control signal to the filter is large, the query is negatively answered and the filtered images are processed again. If the control signal is small, the query is affirmatively answered and the method proceeds to step 414 to output the images.

A further example of method 1) includes processing to remove spatial noise, such as line tearing. In this case, after the imagery has been aligned over time, a non-linear step is then performed to detect those instants where a portion of a feature has been shifted or distorted by noise. An example of a non-linear step is sorting of the intensities at a pixel location, and the identification and rejection of intensities that are inconsistent with the other intensities. A specific example includes the rejection of the two brightest and the two darkest intensity values out of an aligned set of 11 intensities.

An example that combines the previous two techniques is to sort the intensities at each pixel, after the imagery has been aligned, and then to reject for example the two brightest and the two darkest intensities, and to average the remaining 7 intensities for each pixel.

The methods described above can also be performed on features recovered from the image, rather than on the intensities themselves. For example, features may be recovered using oriented filters, and noise removed separately on the filtered results using the methods described above. The results may then be combined to produce a single enhanced image.

An example of method 2) is to use a quality of match metric, such as local correlation, to determine the effectiveness of the motion alignment. If the quality of match metric indicates that poor alignment has been performed, then the frame or frames corresponding to the error can be removed from the enhancement processing. Ultimately, if there was no successful alignment at a region in a batch of frames, then the original image is left untouched.

All of the above methods describe alignment to a common coordinate system using a moving window, or a batch of frames. However other methods of aligning the imagery to a common coordinate system may be used. An example includes a moving coordinate system, whereby a data set with intermediate processing results represented in the coordinate frame of the previous frame is shifted to be in the coordinate system of the current frame of analysis. This method has the benefit of being more computationally efficient since the effects of previous motion analysis results are stored and used in the processing of the current frame.

After alignment, there can be some spatial artifacts that are visible to a viewer. An example of these artifacts may be shimmering, whereby features scintillate in the processed image. This can be caused by slight errors in misalignment that locally are small, but if viewed over large regions, can result in noticeable shimmering. This artifact can be removed by several methods. The first is to impose spatial constraints, and the second method is to impose temporal constraints. An example of a spatial constraint is to assume that objects are piecewise rigid over regions in the image. The regions can be fixed in size, or can be adaptive in size and shape. The flow field can be smoothed within the region, or a local parametric model can be fit to the region. Since any misalignment is distributed over the whole region, then any shimmering is significantly reduced. An example of a temporal constraint is to fit a temporal model to the flow field. For example, a simple model includes only acceleration, velocity and displacement terms. The model is fitted to the spatio-temporal volume locally using methods disclosed in U.S. patent application Ser. No. 09/384,118, filed Aug. 27, 1999. The resultant flow field at each frame will follow the parametric model, and therefore shimmering from frame-to-frame will be significantly reduced. If a quality of alignment metric computed over all the frames shows poor alignment however, then the parametric model can be computed over fewer frames, resulting in a model with fewer parameters. In the limit, only translational flow in local frames is computed.

An example of spatial noise as defined above is the inconsistency of color data with luminance data. For example, a feature may have sharp intensity boundaries, but have poorly defined color boundaries. A method of sharpening these color boundaries is to use the location of the intensity boundaries, as well as the location of the regions within the boundaries, in order to reduce color spill. This can be performed using several methods. First, the color data can be adaptively processed or filtered, depending on the results of processing the intensity image. A specific example is to perform edge detection on the intensity image, and to increase the gain of the color signal in those regions. A further example is to shift the color signal with respect to the intensity signal in order that they are aligned more closely. This removes any spatial bias between the two signals. The alignment can be performed using alignment techniques that have been developed for aligning imagery from different sensors, for example, as discussed in U.S. patent application Ser. No. 09/070,170, filed Apr. 30, 1998, which is incorporated herein by reference.

A further example of processing is to impose constraints not at the boundaries of intensity regions, but within the boundaries of intensity regions. For example, compact regions can be detected in the intensity space and color information that is representative for that compact region can be sampled. The color information is then added to the compact region only. Compact regions can be detected using spatial analysis such as a split and merge algorithm, or morphological analysis.

Resolution Enhancement 308

Resolution of can be enhanced in two ways. The first method is to locate higher resolution information in preceding or future frames and to use it in a current frame. The second method is to actually create imagery at a higher resolution than the input imagery by combining information over frames.

A specific example of the first method is to align imagery in a batch of frames using the methods described in U.S. patent application Ser. No. 09/384,118, filed Aug. 27, 1999, for example, and by performing fusion between these images. In the fusion process, the imagery is decomposed by filtering at different orientations and scales. These local features are then compared and combined adaptively temporally. The local features may be extracted from temporally different frames e.g., the content of frame N may be corrected with content from frame N+4 The combined feature images are then recomposed spatially themselves to produce the enhanced image. An example is where the combination method is to locate the feature with most energy over the temporal window comprising a plurality of frames. This usually corresponds to the image portion that is most in focus. When the images are combined, the enhanced image can show improved resolution if the camera focus was poor in the frame, and potentially increased depth of field.

A specific example of the second method is to use the alignment methods disclosed in U.S. patent application Ser. No. 09/384,118, filed Aug. 27, 1999, and to then perform super-resolution methods, e.g., as described in M. Irani and S. Peleg, "Improving Resolution by Image Registration", published in the journal CVGIP: Graphical Models and Image Processing, Vol. 53, pp. 231–239, May 1991.

Smart Stabilization 318

Many typical videos are unstable, particularly consumer video. The video can be stabilized using basic image alignment techniques that are generally known. In this case, imagery is either aligned to a static reference, or aligned to the preceding frame. However, one problem that arises when the imagery is shifted to compensate for motion, image information is lost at the borders of the image. A typical approach to solve this problem is to increase the zoom of the image. However, the zoom level is typically fixed. A method for determining the level of zoom required can be performed by analyzing the degree of shift over a set of frames, and by choosing a set of stabilization parameters for each frame that minimizes the observed instability in the image, and that at the same time minimizes the size of the border in the image.

For example, a preferred set of stabilization parameters is one that allows piecewise, continuous, modeled motion. For example, the desired motion might be characterized by a zoom and translation model whose parameters vary linearly over time. If the camera is focused on a static object, then a single piecewise model may be used over a long time period. However, if the camera then moves suddenly, then a different set of desired zoom and translation model parameters can be used. It is important however to ensure that the model parameters for the desired position of the imagery are always piecewise continuous. The decision as to when to switch to a different set of model parameters can be determined by methods, e.g., such as those by Torr, P. H. S., "Geometric Motion Segmentation and Model Selection", published in the journal: Philosophical Transactions of the Royal Society A, pp. 1321–1340, 1998.

Another technique for providing image stabilization is to align and combine a plurality of images to form an image mosaic, then extract (clip) portions of the mosaic to form a stabilized stream of images. The number of frames used to from the mosaic represents the degree of camera motion smoothing that will occur. As such, a user of the system can select the amount of motion stabilization that is desired by selecting the number of frames to use in the mosaic. To further enhance the stabilization process, the foreground and background motion in a scene can be separately analyzed such that image stabilization is performed with respect to background motion only.

Deinterlace 312

Figure 5:
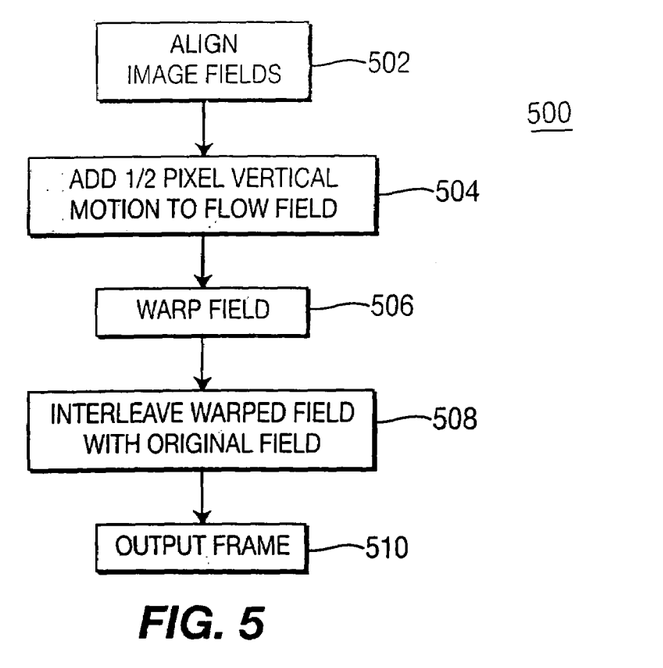
FIG. 5 depicts a flow diagram for converting interlace images into progressive images.

A problem with the conversion of video from one media to another is that the display rates and formats may be different. For example, in the conversion of VHS video to DVD video, the input is interlaced while the output may be progressively scanned if viewed on a computer screen. The presentation of interlaced frames on a progressively scanned monitor results in imagery that appears very jagged since the fields that make up a frame of video are presented at the same time. There are several approaches for solving this problem. The first is to upsample fields vertically such that frames are created. The second method shown in FIG. 5 is to remove the motion between fields by performing alignment using the methods described in U.S. patent application Ser. No. 09/384,118, filed Aug. 27, 1999. At step 502 of method 500, the fields are aligned. Even if the camera is static, then each field contains information that is vertically shifted by 1 pixel in the coordinate system of the frame, or ½ pixel in the coordinate system of the field. Therefore, at step 504, after alignment, a ½ pixel of vertical motion is added to the flow field, the field is then shifted or warped at step 506. A full frame is then created at step 508 by interleaving one original field and the warped field. The method 500 outputs the frame at step 510.

Brightness and Color Control 314

Imagery often appears too bright or too dark, or too saturated in color. This can be for several reasons. First, the automatic controls on the camera may have been misled by point sources of bright light in the scene. Second, the scene may have been genuinely too dark or too bright for the automatic controls to respond successfully in order to compensate.

There are several methods that can be used to solve this problem. First, methods can be used that analyze the distribution of intensity values in the scene and that adjust the image such that the distribution more closely matches a standard distribution. Second, methods can be used to detect specific features in the image, and their characteristics are used to adjust the brightness of the image either locally or globally. For example, the location of faces could be determined using a face finder and the intensities in those regions can be sampled and used to control the intensity over that and adjacent regions. Related methods of performing illumination and color compensation are described in U.S. patent application Ser. No. 09/384,118, filed Aug. 27, 1999.

It is important that modifications to the scene brightness and color do not vary rapidly over time. This is done using two methods. The first method is to smooth the output of the methods described above over time, or smooth the input data temporally. A problem with these methods however is that scene content can either leave the field of view or can be occluded within the image. The result is that image brightness measures can change rapidly in just a few frames. A solution is to use the motion fields computed by methods such as those described in U.S. patent application Ser. No. 09/384,118, filed Aug. 27, 1999, such that only corresponding features between frames are used in the computation of scene brightness and color measures.

Although various embodiments which incorporate the teachings of the present invention have been shown and described in detail herein, those skilled in the art can readily devise many other varied embodiments that still incorporate these teachings.

What is claimed is:

1. A method of image processing comprising:
    segmenting a video sequence into a plurality of video clips;
    processing said video clips of the video sequence identifying common attributes between video clips and tracking the identified common attributes through the plurality of video clips;
    storing said video clips in said database such that the stored video clips comprise video clips having the tracked identified common attributes; and
    indexing said stored video.

2. The method of claim 1 further comprising:
    accessing said database using a web page authoring tool to organize said video clips.

3. The method of claim 2 wherein said tracking is interactive and is provided by said web page authoring tool.

4. The method of claim 3 wherein said interactive links are based upon at least one attribute of the video clips.

5. The method of claim 1 further comprising:
    compressing said video clips and said video sequence using a high resolution compressor; and
    a DVD authoring tool for organizing said compressed video clips and video sequence onto a DVD.

6. The method of claim 5 wherein said tracking is interactive between compressed video clips and is provided by said DVD authoring tool.

7. The method of claim 6 wherein said interactive links are based upon at least one attribute of the compressed video clips.

8. The method of claim 1 further comprising:
    adding ancillary data to said video clips.

9. The method of claim 8 wherein the ancillary data is an annotation.

10. The method of claim 8 wherein the ancillary data is an index to other video clips having similar attributes.

11. The method of claim 1 further comprising:
    enhancing the stored video clips.

12. The method of claim 11 wherein said enhancing further comprises:
    reducing image noise in said video clips.

13. A method of image processing comprising:
    segmenting a video sequence into video clips;
    storing said video clips in a database with an associated unique identifier;
    storing said video clips in said database;
    indexing said stored video; and
    enhancing the stored video clips, wherein said enhancing further comprises:
        reducing image noise in said video clips, wherein said step of reducing image noise further comprises:
            aligning images in an image sequence within the video clips;
            averaging pixels in said aligned images over time;
            performing a temporal fast Fourier transform on said averaged pixels to produce a control signal;
            controlling a filter using said control signal; and
            filtering said image sequence.

14. A method of image processing comprising:
    segmenting a video sequence into video clips;
    storing said video clips in a database with an associated unique identifier;
    storing said video clips in said database;
    indexing said stored video; and
    enhancing the stored video clips, wherein said enhancing step further comprises:
        deinterlacing images in said video clips.

15. The method of claim 14 wherein said deinterlacing step further comprises:
    aligning a first image field to a second image field of an interlaced scanned image sequence within said video clip to produce a flow field;
    adding a one-half pixel vertical motion to said flow field;
    warping said second image field using said flow field;
    interleaving said warped second field with said first field;
    outputting a progressively scanned frame.

16. A method of deinterlacing an image sequence comprising:
    aligning a first image field to a second image field of an interlaced scanned image sequence to produce a flow field;
    adding a one-half pixel vertical motion to said flow field;
    warping said second image field using said flow field;
    interleaving said warped second field with said first field;
    outputting a progressively scanned frame.

* * * * *